Patented Apr. 24, 1951

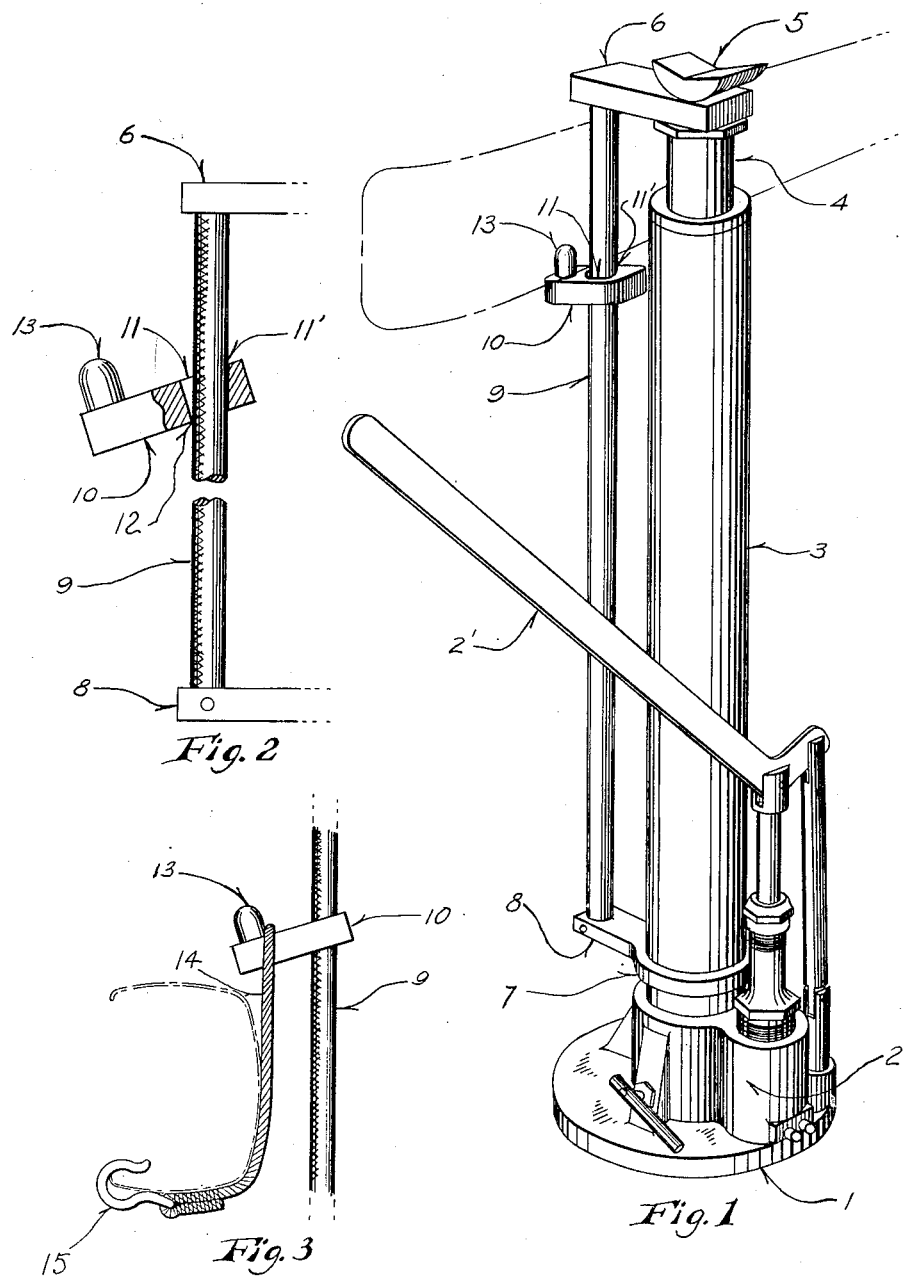

2,549,862

UNITED STATES PATENT OFFICE 2,549,862

BUMPER JACK

Herbert A. Thorndike, Oshkosh, Wis., assignor, by mesne assignments, to Vulcan Manufacturing Co., Inc.

Application March 28, 1946, Serial No. 657,730

1 Claim. (Cl. 254—93)

This invention relates to certain new and useful improvements in jacks for automotive vehicles, and more particularly to a jack which is capable of being used either as a bumper jack or a ram jack.

Farmers, particularly, find need for a general purpose jack capable of lifting extremely heavy loads and having an especially high lift. These requirements are essential where the jack is to be used for removing tractor tires, which may have outside diameters as large as eighty (80) inches.

For maximum utility, however, such a jack should also be adaptable to use with automobiles, where the wheel axle clears the ground by less than the normal retracted height of the jack head. It is desirable that a bumper jack attachment be permanently affixed to the jack but that it not interfere with its operation as a ram jack.

To this end, the jack of this invention provides a bumper attachment for a high lift heavy duty jack which enables the same to be used for jacking up automobiles in the customary manner, i. e. by engaging the bumper thereof.

Although primarily intended for use with a hydraulic jack similar to that which forms the subject matter of my Patent No. 2,472,867, issued June 14, 1949, it will be readily apparent that the principles of this invention are also adaptable to mechanical jacks of the ram type.

It is therefore an object of this invention to provide a bumper jack attachment carried by a high lift ram jack to permit the same to be readily used on automobiles.

A further object of this invention resides in the provision of a bumper jack which may be easily and quickly adjusted for initial engagement with an automobile bumper at any height.

And still another object of this invention is to provide a compact and inexpensive jack which may be used alternatively either as a ram jack or a bumper jack, but which can be stored in substantially the same space as a ram jack.

With the above and other objects in view which will appear as the description proceeds, this invention resides in the novel construction, combination and arrangement of parts substantially as hereinafter described, and more particularly defined by the appended claim, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a view in elevation of a ram type jack embodying the bumper jack of this invention;

Figure 2 is a side view of the manner of adjustably mounting the bumper hook which forms a part of this invention; and Figure 3 illustrates an attachment for the bumper hook which enables it to accommodate an unusually wide bumper.

Referring now more particularly to the accompanying drawing, the numeral 1 designates the base of a hydraulic ram jack of a type to which this invention is especially adaptable. A pump 2 having an operating handle or lever 2', provides means for sending fluid under pressure into the jack cylinder 3 in order to extend the ram 4.

Fastened near the top of the ram 4 just below the head thereof 5, is an arm 6 which extends laterally therefrom to a point beyond the cylinder 3.

A ring 7, slidably carried by the jack cylinder 3, has a radial arm 8 extending laterally beyond the cylinder 3 a distance substantially equal to the arm 6. A rod 9, substantially equal in length to the travel of the jack ram, has its ends fastened to the arms 6 and 8 so that ram 4, arms 6 and 8, and rod 9 move as a unit.

A bumper hook unit is adjustably carried by the rod. In practice, it is preferred to form the bumper hook as shown in Figure 2 from a substantially rectangular bumper engaging block 10 having near its rear end a vertical opening 11. The rear wall 11' of the opening is inclined upwardly and rearwardly with respect to the face of the block. The diameter of this opening at its bottom is slightly greater than that of the rod 9 which passes through it, so that the block may be slid freely along the rod for initial engagement with a bumper when the block is held substantially perpendicular to the rod. However, when the free end of the block is released, the block drops into the inclined position in which it is shown in Figure 2, and the lower edge 12 of the opening 11 binds with the rod to secure it in position. The weight of an automobile on the bumper hook will bind the edge 12 of the opening 11 to the rod more securely, and if desired the rod 9 may be knurled to increase binding friction.

A knob or protrusion 13 on the free end of the block is adapted to be engaged with the bumper of the car to be raised thus preventing the bumper from slipping off of the block.

In use, the retracted jack is placed under an automobile bumper, the bumper hook adjusted along the rod until it engages the bumper, and the jack then raised in the usual manner. Elevation of the ram carries the rod, and thus the bumper hook, upward with it.

The attachment shown in Figure 3 provides a means for lifting automobiles having unusually wide or thick bumpers which cannot be engaged by the bumper hook described above.

This attachment consists of a loop of cable 14 passed through the eye of a hook 15. In use, the cable loop is caught around the knob 13 of the block 10 and passed under the bumper to be lifted and the hook 15 is secured on the edge portion thereof. The bumper is thus supported directly by the cable loop.

While the preferred embodiment of my invention has been described above, it will at once be apparent that it permits of numerous variations falling within the spirit of the invention and the scope of the appended claim.

From the foregoing description, taken with the accompanying drawing, it will be readily apparent that this invention provides a bumper jack which forms a compact component of a high lift ram type jack.

What I claim as my invention is:

In a jack of the character described: inner and outer telescoping jack elements one of which is extensible upon operation of the jack, said elements being relatively rotatable; a radial arm fixed to and extending from the outer end of said extensible element; a rod secured at one of its ends and extending lengthwise alongside the jack elements; means at the other end of said rod retaining it in parallel relationship with the jack elements while enabling endwise movement thereof upon extension of said extensible element, said means comprising a ring completely encircling the other of said jack elements and freely rotatable and slidable thereon to enable said arm and rod to be swung to any of a number of positions around the periphery of the jack elements; a bumper carrying block having a hole vertically therethrough near one end thereof to loosely receive said rod, said hole being of such diameter as to permit the bumper carrying block to be slid freely along the rod for vertical adjustment but to cause the edges of said hole to bite into the rod when a load is applied to the free end of the bumper carrying block in a direction substantially parallel to the rod; and means on said bumper carrying block to engage with a bumper and prevent it from slipping off the block.

HERBERT A. THORNDIKE.

REFERENCES CITED

The following references are of record in the file of this patent:

UNITED STATES PATENTS

| Number | Name | Date |
| --- | --- | --- |
| 1,321,950 | Templeton | Nov. 18, 1919 |
| 1,807,351 | Supan | May 26, 1931 |
| 2,171,832 | Hoeppner | Sept. 5, 1939 |
| 2,378,836 | Coffing | June 19, 1945 |